United States Patent [19]

de Camargo

[11] 4,342,033
[45] Jul. 27, 1982

[54] WAVE ACTION DEVICE FOR RADIO FREQUENCIES

[76] Inventor: Luiz M. V. de Camargo, Rua Gomes Carneiro, 34 Apt. 901 - Ipanema, Rio de Janeiro, RJ, Brazil

[21] Appl. No.: 115,445

[22] Filed: Jan. 25, 1980

Related U.S. Application Data

[63] Continuation-in-part of Ser. No. 837,156, Sep. 28, 1977, abandoned.

[30] Foreign Application Priority Data

Oct. 15, 1976 [BR] Brazil ............................ 17606976[U]

[51] Int. Cl.³ ............................................. H01Q 19/06
[52] U.S. Cl. ..................................... 343/753; 343/909
[58] Field of Search ............... 343/753, 754, 755, 909, 343/910, 911 R

[56] References Cited

U.S. PATENT DOCUMENTS

| | | | |
|---|---|---|---|
| 2,530,580 | 11/1950 | Lindenblad | 343/753 |
| 2,547,416 | 4/1951 | Skellett | 343/911 R |
| 2,959,784 | 11/1960 | Pierce | 343/754 |
| 3,144,606 | 8/1964 | Adams et al. | 343/909 |
| 3,189,907 | 6/1965 | Buskirk | 343/910 |
| 3,453,629 | 7/1969 | Stahler et al. | 343/909 |
| 3,495,265 | 2/1970 | Smith | 343/911 |
| 3,815,138 | 6/1974 | Haley | 343/909 |
| 3,982,249 | 9/1976 | Toman | 343/753 |

*Primary Examiner*—Eli Lieberman
*Attorney, Agent, or Firm*—Steinberg & Raskin

[57] ABSTRACT

A wave action device for beams of radio frequency waves operates as an electromagnetic lens at an electromagnetic wave relay station to redirect the electromagnetic beam in selective high concentration of the beam to one or more specific points. The device is positioned in the region of an electromagnetic wave link and intercepts the electromagnetic beam, barring that portion of the beam which forces the appearance of a null field at selected points of reception. The phase and the amplitude of the remaining portion of the intercepted electromagnetic beam are modified to redirect the remaining portion of the beam in a passive manner. The remaining portion of the beam is selectively concentrated and diverged with respect to the selected points of reception.

6 Claims, 49 Drawing Figures

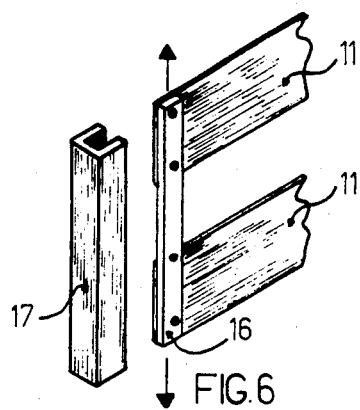
FIG.6
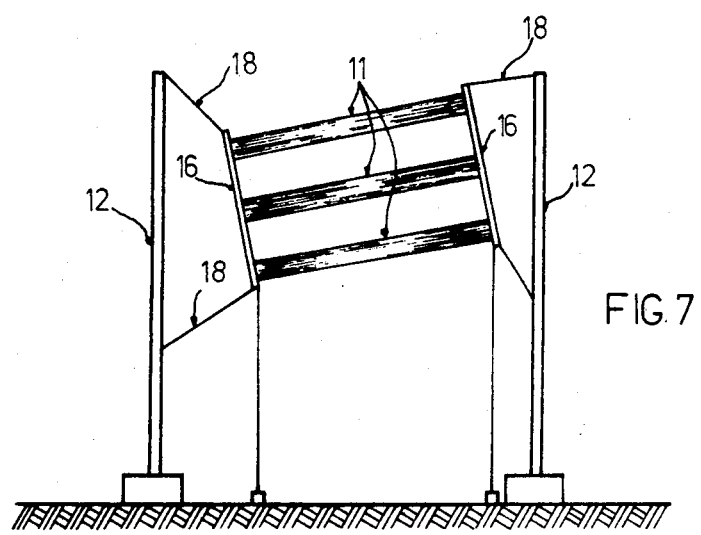
FIG.7
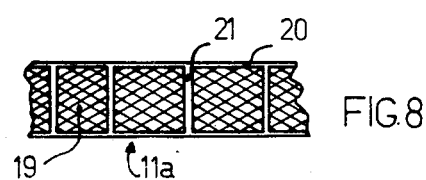
FIG.8
   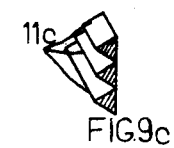 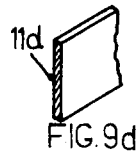
FIG.9　FIG.9a　FIG.9b　FIG.9c　FIG.9d

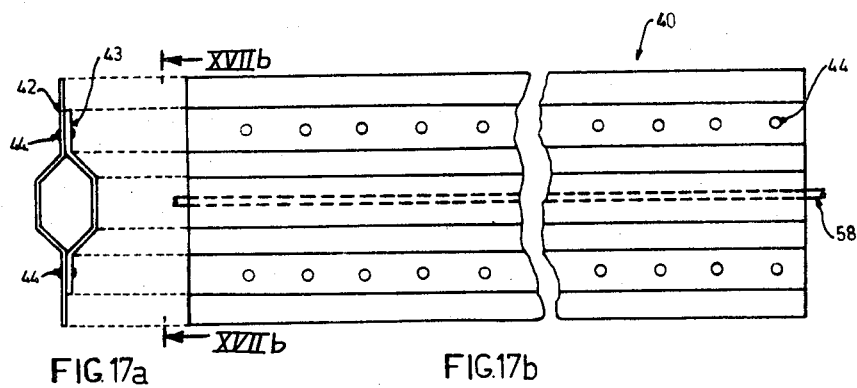
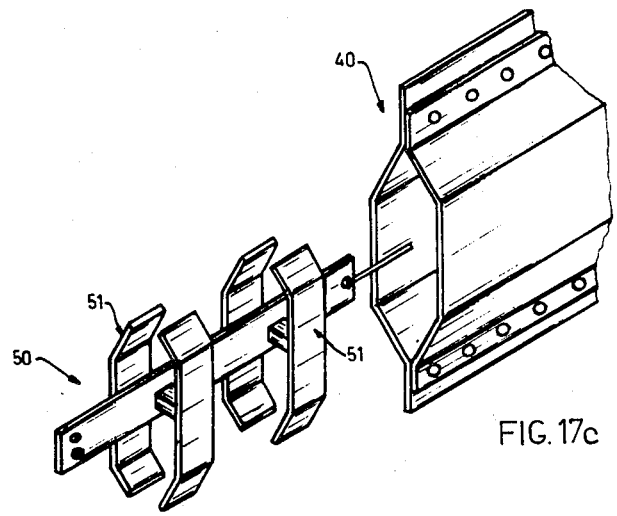
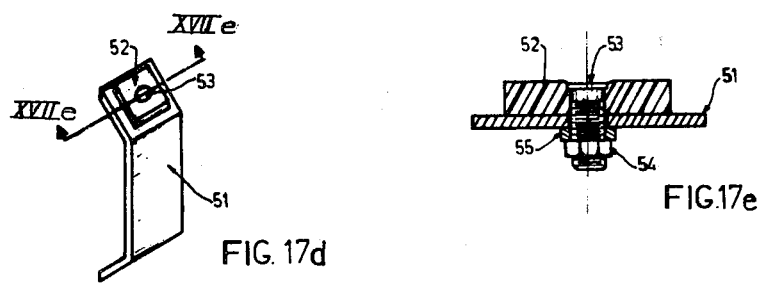

FIG. 20
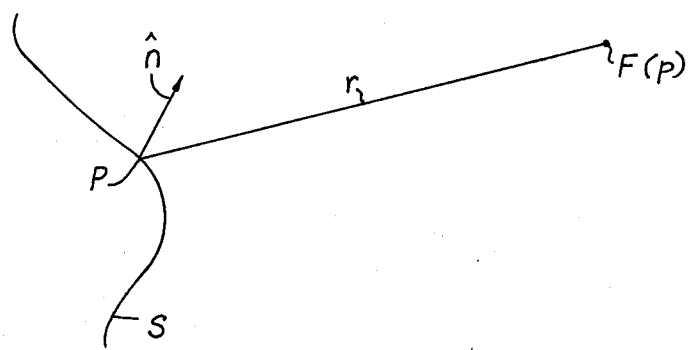
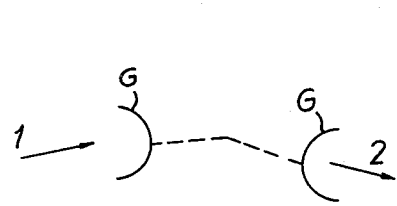
FIG.21a
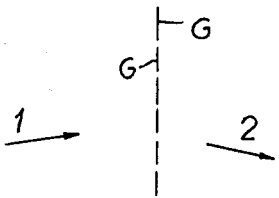
FIG.21b
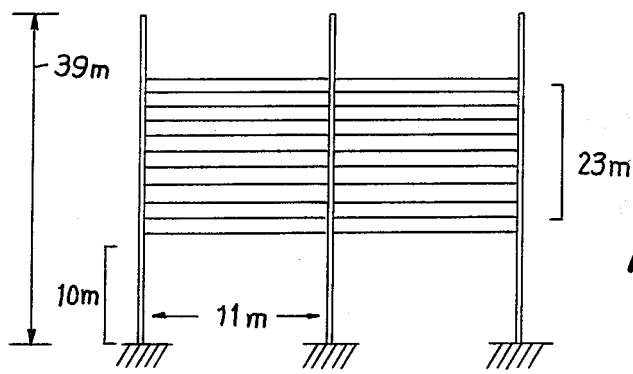
FIG.22
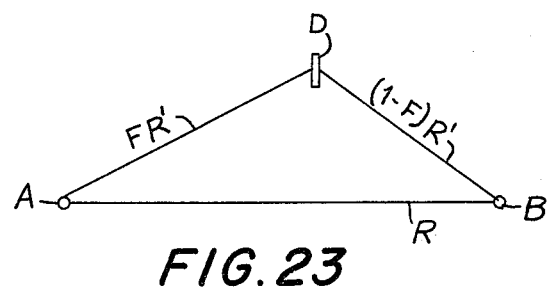
FIG.23

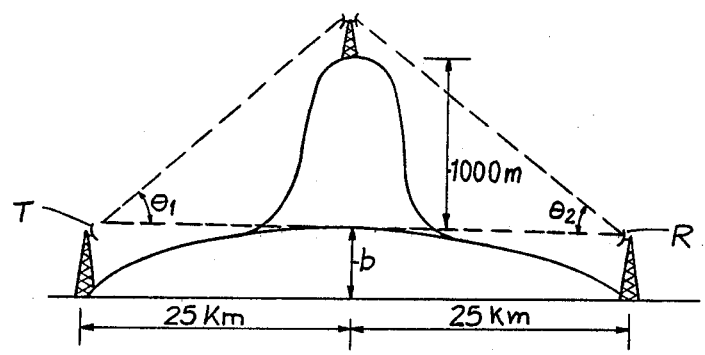
FIG. 24
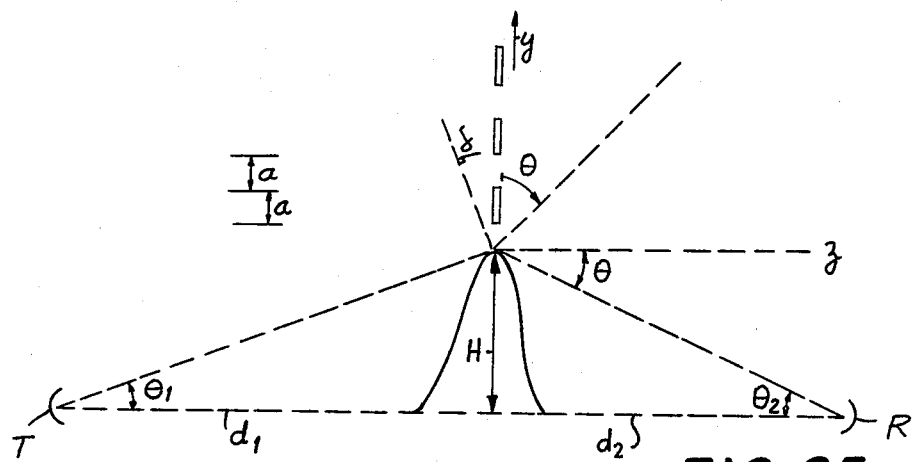
FIG. 25
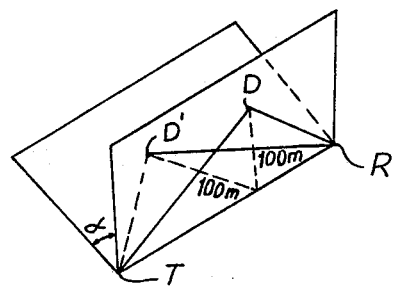
FIG. 26a
FIG. 26b
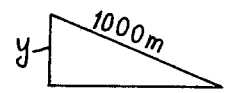
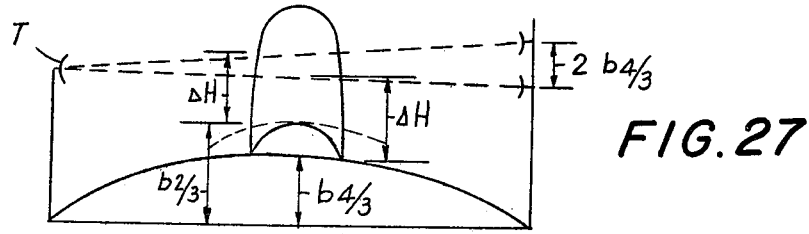
FIG. 27

WAVE ACTION DEVICE FOR RADIO FREQUENCIES

BACKGROUND OF THE INVENTION

This is a continuation-in-part of pending patent application Ser. No. 837,156 for Ondulatory Action Device for Radio Frequencies, filed Sept. 28, 1977 and now abandoned.

The present invention relates to a wave action device for radio frequencies. The device of the invention operates as an electromagnetic lens at relay stations of electromagnetic waves of any frequency in order to redirect the electromagnetic beam and provide an arbitrarily high concentration of such beam to one or more given points.

SUMMARY OF THE INVENTION

The principal object of the invention is to provide a wave action device for redirecting waves of any type and modifying the phase and amplitude of the waves.

An object of the invention is to provide a wave action device which functions in accordance with Huyghen's theorem of wave propagation, as modified by Kirchhoff-Fresnel, to redirect and focus waves of any type.

Another object of the invention is to provide a wave action device of practicable size, which is of simple structure and utilizes knife-edge diffraction to stabilize K factor variations in refractive conditions of the atmosphere.

Still another object of the invention is to provide a wave action device which functions as a lens for waves of any type and stabilizes a beam of waves with respect to fluctuations in refractive index.

Yet another object of the invention is to provide a wave action device which redirects waves of any type and provides them with real gain, as well as focussing them.

Another object of the invention is to provide a wave action device of simple structure, which is inexpensive in manufacture and functions efficiently, effectively and reliably as a wave lens.

Still another object of the invention is to provide a wave action device which functions efficiently, effectively and reliably as an electromagnetic lens at a location remote from the source of an electromagnetic beam.

Yet another object of the invention is to provide a wave action device which redirects a microwave beam and provides it with super gain.

Another object of the invention is to provide a wave action device which functions as an electromagnetic lens and may be made insensitive to K factor variations in refractive conditions of the atmosphere, so that it provides a total radiation pattern which always reaches the receiver and is always reached by the transmitter.

In accordance with the invention, a wave action device for a wave beam emitted from a source, the wave action device operating as a lens at a relay station remote from the source of the beam to redirect the beam in selective high concentration of the beam to one or more specific points, the wave action device being positioned in the region of a wave link at the remote relay station, comprises a pair of spaced supports. An interceptor intercepts the beam to eliminate that portion of the beam which forces the appearance of a null field at selected points of reception. The interceptor comprises elongated spaced blades of predetermined dimensions positioned in a plane substantially transverse to the direction of propagation of the beam. The blades have spaces of predetermined dimensions between them. Each of the blades has a side knife-edge, spaced opposite ends and a longitudinal axis extending therebetween. Each of the blades has a width of a dimension determined by the operating characteristics of the device. The spaces have dimensions determined by the operating characteristics of the device. A modifier modifies the phase and the amplitude of the remaining portion of the intercepted beam to redirect the remaining portion of the beam in a passive manner. The modifier selectively concentrates and diverges the remaining portion of the beam with respect to the selected points of reception. The modifier comprises the spaces and the knife-edges of the blades for modifying the phase and the amplitude of the remaining portion of the beam. A mounting device mounts the blades at their ends on the supports in a manner whereby the blades lie substantially horizontally and are adjustably moveable relative to horizontal.

The principle of the operation of the device of the invention is summed up as follows. In the space between two telecommunications relay stations there is electromagnetic energy in propagation. For a given instant of time, this wave energy is distributed in said space, with all possible phases. The corpuscular characteristics are not relevant.

Accordingly, a device placed in said space which will either block or transform the phase of the electromagnetic energy distributed there, will necessarily cause a spatial rearrangement of all of the electromagnetic energy throughout the relevant space. If such blocking or phase transformation is carried out judiciously, two concomitant effects may result. One effect is the arbitrary redirection of the direction of propagation of the electromagnetic energy. The second effect is a measurable increase of the signal received by any of the relay stations at the terminals of the link served by the device. The signal may be even much stronger than that which an antenna could transmit to another on a direct line of sight. From these effects, it can be seen that the device has a convergent lens as its optical counterpart.

The device may also be designed to operate as a divergent lens. One of its applications in this mode is to permit radio broadcasting in regions where a direct line of sight is not possible. In this case, redirection of the electromagnetic beam takes the form of a spreading or diffusion of said beam, and a measurable increase of the signal is obtained at points where there was no signal before or where its intensity was very weak.

The device of the invention was conceived in accordance with the aforementioned principles of operation. The device of the invention basically comprises a plurality of metal screens, with mesh sized in accordance with the frequency and polarization of the electromagnetic energy in question, or metal blades. The metal blades are appropriately sized and supported at their ends on adequate pylons or brackets and are positioned so that there is a space between next-adjacent ones of said blades. The spaces between the blades are also appropriately sized and positioned.

The metal blades or screens may also be replaced by blades of dielectric material having appropriate electric characteristics, size and positioning. The dielectric material may also occupy the spaces between the blades.

The electromagnetic lens thus formed may be adapted to use by mounting the blades, screens or dielectric material so they may be displaced vertically and horizontally. This type of construction has the advantage of allowing sharper tuning of the lens. With such appropriate sizing and positioning, it is possible to obtain a suppression of most of the atmospheric effects, notably refraction, which in technical parlance is referred to as the K factor. The K factor defines the Earth radius equivalent and is K times the real radius of the Earth. The effects of interference are also considerably reduced, whether the interference be from reflections of the transmitted signal by the soil or in the atmosphere, or due to signals from other radio sources.

In complete analogy to optical systems, it is also possible to form systems consisting of various lenses or several lenses with reflectors. The advantages of these systems are countless. The association of lenses allows original solutions to numberless problems in telecommunications, as hereinafter explained.

As indicated by the foregoing, the device of the invention is passive. That is, it does not consume power, and requires no external source of power during operation. The device has two characteristic properties with regard to its action on a beam of electromagnetic waves of any frequency. First, the device is capable of directing an electromagnetic beam. Second, the device is capable of obtaining an arbitrarily high concentration of that beam to one or more given points.

Thus, if a given point in space is not receiving the electromagnetic beam, one may, by using the device of the invention, force the magnetic beam to move through that point and, furthermore, force the beam to concentrate on that point. This results in a weak intensity electromagnetic signal at said point in space, having its intensity increased. The passive device of the invention therefore provides gain.

BRIEF DESCRIPTION OF THE DRAWINGS

For a better understanding of how the device of the invention is constructed, it will now be described in detail with reference to the accompanying drawings, presented not restrictively but by way of illustration only, in which drawings:

FIG. 6 is a perspective view, on an enlarged scale, of part of the embodiment of FIG. 4, illustrating a system for mounting the blades to permit vertical adjustment of the tuning of the device;

FIG. 7 is a view, on a reduced scale, of a modification of the embodiment of FIG. 4, illustrating another system for mounting the blades on the supports of the device;

FIG. 8 is a view of part of a blade of another embodiment of the device of the invention, consisting of a metal screen;

FIGS. 9, 9a, 9b, 9c and 9d are perspective views, partly in section, on a reduced scale, of different blades of dielectric material of still another embodiment of the wave action device of the invention;

FIG. 17a is an end view, on an enlarged scale, of an embodiment of a blade of the wave action device of the invention;

FIG. 17b is a side view of the embodiment of FIG. 17a, taken along the lines XVIIb—XVIIb of FIG. 17a;

FIG. 17c is a perspective view, on an enlarged scale, of the embodiment of FIG. 17a;

FIG. 17d is a perspective view, on an enlarged scale, of a component of the supporting structure of the embodiment of FIGS. 17a, 17b and 17c;

FIG. 17e is a cross-sectional view, on an enlarged scale, taken along the lines XVIIe—XVIIe of FIG. 17d;

FIG. 20 is a graphical presentation of Equation (1);

FIG. 21a is a schematic diagram of equivalent back-to-back antennae;

FIG. 21b is a schematic diagram of the wave action device of the invention in operation to redirect beams;

FIG. 22 is a schematic diagram of the wave action device dimensioned in accordance with the Example;

FIG. 23 is a graphical presentation of Equation (6);

FIG. 24 is a schematic diagram of the Example;

FIG. 25 is a schematic diagram illustrating the determination of the vertical dimensions of the blades of the wave action device of the Example;

FIGS. 26a and 26b are schematic diagrams illustrating considerations pertinent to radio transmission engineering;

FIG. 27 is a schematic diagram showing the obstruction for the transmitter and receiver antennae;

DESCRIPTION OF PREFERRED EMBODIMENTS

Figure 1:
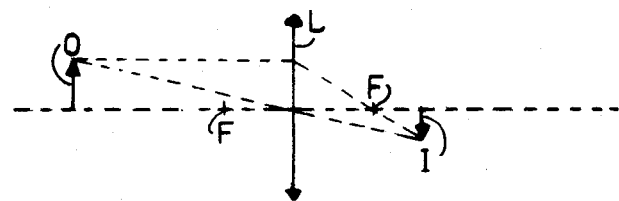
FIG. 1 is a schematic diagram illustrating the action of a converging glass lens on light rays.
Figure 1A:
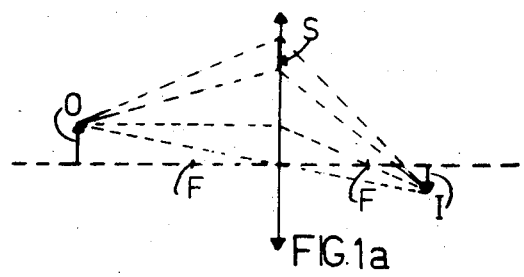
FIG. 1a is a schematic diagram, similar to that of FIG. 1, detailing the independent operation of a given segment of the converging lens.
Figure 2:
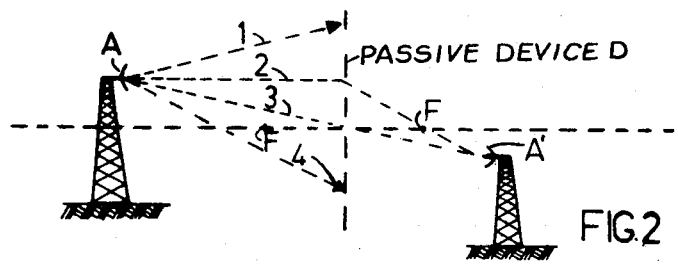
FIG. 2 is a schematic diagram of the action of a convergent electromagnetic lens device of the invention on a beam of electromagnetic waves, showing the analogy to the convergent lens device shown in FIG. 1.

FIGS. 1, 1a, 2 and 2a show an analogy between an embodiment of the device of the invention and a convergent lens. FIGS. 1 and 1a illustrate the action of a convergent lens L, or a segment S of the lens, on light rays. The image I to the object O is conjugated and F are the foci. FIG. 2 illustrates the action of the passive device D of the invention on a beam of radio waves. The device D receives the radio beam from an antenna A, redirecting some of its rays to a receiving antenna A', on a direct line of sight with the transmitting antenna A. The beam is limited by rays 1 and 4, while rays 2 and 3 correspond to the light rays of the diagram of FIG. 1.

Figure 2A:
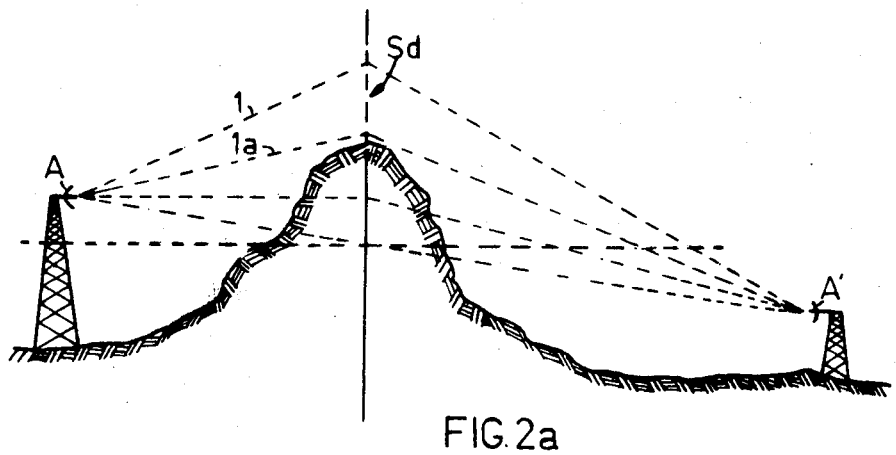
FIG. 2a is a schematic diagram, similar to that of FIG. 2, illustrating the operation of a segment of a passive device of the invention mounted on a mountain standing between two relay stations.

FIG. 2a illustrates the action of a segment Sd of the passive device on a beam of radio waves. In this case, the segment Sd of the device receives the divergent beam from the transmitting antenna A, redirecting the intercepted rays to concentrate them on the receiving antenna A', the direct line of sight between the antennae being blocked by a mountain. The segment Sd of the device acts on the intercepted rays in a manner analogous to that illustrated in FIG. 1a, for the segment of convergent lens S.

Figure 3:
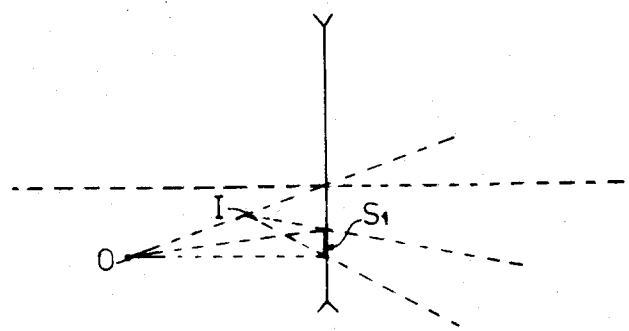
FIG. 3 is a schematic diagram showing the action of a segment of a divergent lens on a beam of light.
Figure 3A:
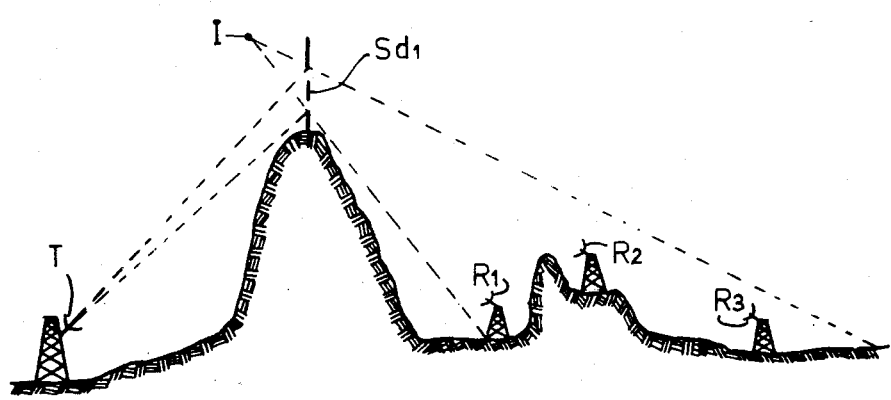
FIG. 3a is a schematic diagram showing the action of a segment of a device of the invention on a beam of electromagnetic waves, showing the analogy to the divergent lens device shown in FIG. 3.

FIGS. 3 and 3a show an analogy between another embodiment of the passive device and a divergent lens. In FIG. 3, showing a segment S1 of the divergent lens, the object O is real and the image I is virtual. In FIG. 3a, the segment Sd1 of the passive device receives the divergent beam of electromagnetic waves transmitted by a transmitter T and redirects such beam to receivers R1, R2 and R3, which have their lines of sight to the transmitter blocked, by, for example, mountains. Transmission is undertaken as if the transmitter T were at I. It is obvious that such an arrangement has a great and important application in radio and TV broadcasting, since the passive device diverges the electromagnetic beam instead of concentrating it at a point.

The passive device of the invention is fundamentally a pure wave device and functions with waves of any nature; mechanical such as, for example, sound, water, wind, or the like, electromagnetic, or other.

The passive device of the invention may be basically built with metal elements or elements of dielectric material. The device may also be built with elements of a hybrid type made of metal and dielectric material.

Figure 4:
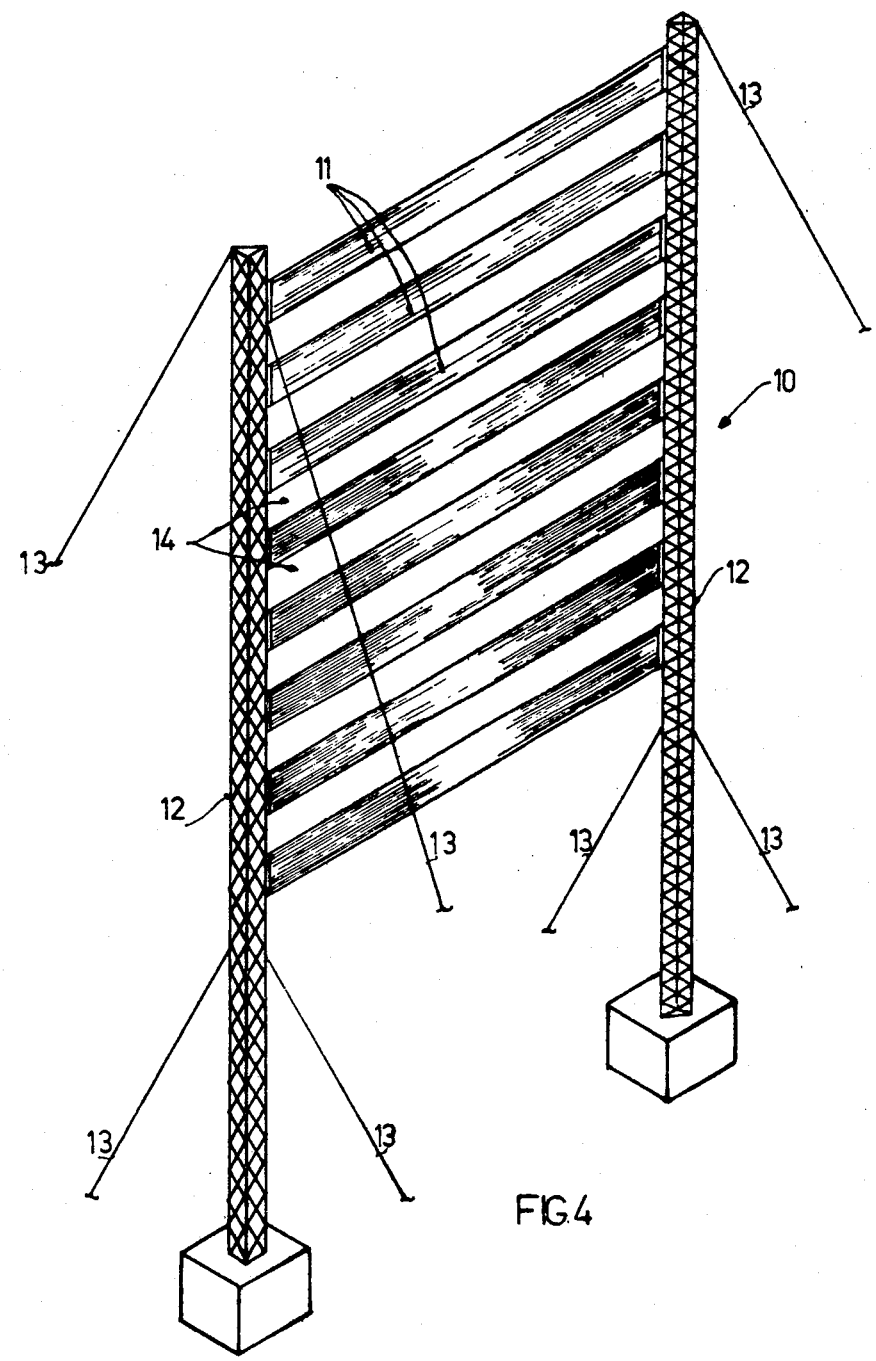
FIG. 4 is a simplified perspective view of an embodiment of the wave action device of the invention.

As shown in FIG. 4, the metal type passive device of the invention comprises a plurality of metal blades 11 of appropriate size and position. The blades 11 are mounted at their ends on supports 12, which may be of any suitable structural form. In the embodiment of FIG. 4, the supports 12 take the shape of two vertical towers, standing a distance apart approximately equal to the length of the blades 11 and maintained erect by means of adequate guy wires 13.

The metal blades 11 are mounted on, and extend between, the supports 12 in a manner whereby spaces 14 are formed between next-adjacent blades. As hereinbefore mentioned, both the width and length dimensions of each blade and the spaces 14 between them are provided specifically for each specific case. These dimensions define the activity of the device 10.

Figure 5:
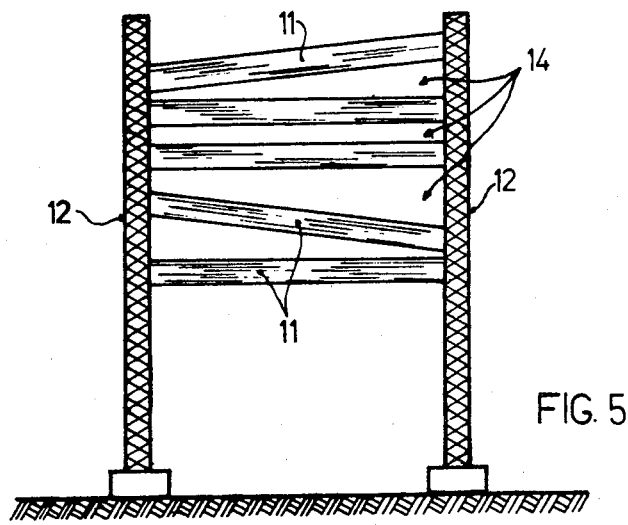
FIG. 5 is a view, on a reduced scale, of the embodiment of FIG. 4, showing the variation of the relative positioning of the blades.

In FIG. 4, the blades 11 are positioned parallel to each other. It should be understood, however, that parallel arrangement of the blades is not obligatory and the blades may occupy other relative positions, as shown in FIG. 5. The positions of the blades are specifically determined for the programmed operating characteristics of the wave action device of the invention.

Due to its operating characteristics, the device of the invention requires accurate installation in order to provide the proper tuning of the transmitting and receiving stations. It is therefore essential that careful field measurements, including topographical data, among others, be taken, taking into consideration the relevant corrections such as optical, for instruments, atmospheric, etc. This enables the construction of the wave action device of the invention with the correct measurements and positioning and provides as perfect a tuning as possible.

The wave device of the invention is built with its blades 11 rigidly affixed to the supports 12. Thus, if an error occurs in the positioning of the device after field assembly thereof, adjustment of the tuning requires specified adaptations to the stations at the ends of the link served by the device. On this account, this type of tuning adjustment is not discussed herein. In order to provide the wave action device of the invention with some versatility with regard to the required accuracy of its positioning, means may be provided to permit a tuning adjustment by moving the blades. One of the adjustment systems comprises the use of blades capable of rotating on their longitudinal axes, in order to offer a variable effective area to the receiving direction of the electromagnetic beams, more particularly, by varying the width of the spaces between the blades. In this embodiment, the blades may rotate together through the same angle or individually through different angles.

Any suitable means may be utilized to mechanically affix and move the blades in relation to the supporting towers, including devices for manual or non-manual actuation.

In the blade adjustment system shown in FIG. 6, a given group of blades 11 is affixed at its ends to two rigid rods 16, only one of which rods is shown in FIG. 6. The rods 16 are displaceable along guide rails 17 affixed to each of the towers 12. The group of blades may thus be moved vertically via suitable means and/or devices such as, for example, cables and pulleys. Each mentioned group of blades 11 may include all the blades in the wave action device or only part of them. FIG. 6 illustrates, as an example, one of the numberless configurations of a blade adjustment system.

Although it is not shown in the Figs., another blade adjustment system is obvious. Such a system includes both devices of the aforementioned two adjustment systems. Thus, in the third system, the blades 11 of one of the groups of blades may be displaced vertically and by rotation.

FIG. 7 shows a fourth tuning or blade adjustment system comprising the assembly of a set of blades 11 between two opposite end rods 16 supported by towers or supports 12 via cables 18. Although complex in structure, this system provides great flexibility of positioning of the wave action device after it has been assembled in the field. The set of blades may be moved both vertically and horizontally and its inclination may be varied.

A radical manner of retuning a considerably out-of-tune wave action device of the invention is by using a second wave action device to operate in conjunction with the first. In optics, the system corresponds to the use of various lenses in conjunction, in order to obtain specific purposes.

Although the blades 11 have hereinbefore been described as metallic and integral, they may be formed of metal screens 11a of appropriate mesh and dimensions, as shown in FIG. 8. A blade 11a may be constructed from a metal screen in various ways. One of the possible constructions is the attachment of a screen 19 to a metal frame 20 provided with crossbars 21 (FIG. 8).

As hereinbefore noted in connection with the embodiment of the device constructed of metal blades, the spaces between the metal screens are sized for each specific case in which the device is provided for use. This sizing, of course, depends upon the distance between the antennae, the height of any obstruction interposed in the line of sight between the transmitter and receiver, and the wavelength of the electromagnetic beam.

Several optimizations may be obtained by properly and suitably selecting the dimensions of the apertures and spaces, not keeping them constant, and also suitably positioning them.

In one specific embodiment, the device was designed for a 39.5 km microwave link operating in the 7.5 GHz band. The link had an obstruction at 5.3 km from one of the ends. The relative positions of the antennae were such that the line of sight intersected the obstruction at 13.2 m below its top. A device was constructed comprising five metal screens horizontally extending between a pair of supports. In order to provide space for a potential obstruction, the lowest screen had a height of 2.67 m and had its lowermost edge located at a height of 14.71 m from the ground. The second screen had a height of 2.07 m and had its lowermost edge located at 19.56 m from the ground. The third lowest screen had a height of 1.90 m and had its lowermost edge located 23.61 m from the ground. The fourth lowest screen had a height of 1.77 m and had its lowermost edge located 27.34 m from the ground. The highest screen had a height of 1.66 m and had its lowermost edge located 30.83 m from the ground. The wavelength of the beam was 0.04 m. The device brought the signal at reception to its free space value of −38 dBm, that is, that value which it would attain if the transmission from one station to another were not impaired by an intervening obstruction. The transmitter power was +27 dBm and the total antenna gain was 89.4 dB.

As hereinbefore mentioned, several optimum configurations may be obtained for a particular case and such configurations are easily arrived at by known mathematical calculations for each specific case.

Both the metal plate blades 11 and the metal screen blades 11a may include structural reinforcements in them, as hereinafter described. These reinforcements prevent great deformation of the blades by the action of the winds. The metal type wave action device makes use of its blades 11 or 11a to bar part of the electromagnetic beam, specifically that part which forces the appearance of a null field at the point of reception. The free space between the blades permits the convenient part of the beam to pass. Thus, all the dimensions and positions of all the components of the device of the invention are critical.

As hereinbefore mentioned, the wave action device may have blades made of dielectric material. In FIGS. 9, 9a, 9b, 9c and 9d are shown different shapes for blades 11c of dielectric material. In this case, either the blades 11c occupy all the effective area of the device, thus eliminating the so-called "empty spaces", or said blades are spaced in the same manner as described for the metal blades, in which case blades 11d of dielectric material having a cross-section like that illustrated in FIG. 9d are used.

Everything hereinbefore stated with regard to the wave action device of the invention having metal blades applies to the device having blades of dielectric material. An exception is that the device having blades of dielectric material operates to continuously modify the phase distribution in a plane, preferably, but not necessarily, transverse to, the propagation of the beam, whereas the device having metal blades modifies the phase distribution noncontinuously. This is due to the fact that the metal blade device, upon barring portions of the beam, introduces equivalent modifications of phases and amplitudes.

It is apparent that devices with blades of dielectric material are much more efficient. In devices where the blades 11d (FIG. 9d) are mutually spaced, both the "empty spaces" and the blades themselves act to redirect the electromagnetic beam. In devices where the blades 11c (FIGS. 9, 9a, 9b and 9c) occupy all of the area of the device, the efficiency is even greater. The entire intercepted portion of the beam is redirected to the subsequent station.

A dielectric or dielectric material is usually characterized by a parameter (E) called the dielectric parameter. In general, (E) is a complex number describing an ohmic or heat loss characteristic of the dielectric and a phase lag. As a rule, dielectrics can and should be selected with a negligible ohmic loss, which is characterized by (E)s have a small real value.

Constancy of the value of the parameter (E) is a primary requirement in the manufacture of devices having blades of dielectric material. It is such constancy which expresses the degree of homogeneousness of the dielectric and make the operation of the system of the device successful or a failure.

Another version of the wave action device of the invention utilizes blades made of artificial dielectric material which consists of a set of metal elements maintained in relative fixed positions by dielectric elements. The blades have an equivalent dielectric parameter (Eeq) which differs from the dielectric parameter (E) of the dielectric material used. Thus, the metal elements vary the dielectric parameter of a given dielectric material.

Everything hereinbefore stated concerning devices with metal blades and with blades of dielectric material also holds for devices with hybrid blades of dielectric material and metal. The hybrid blade permits an even more varied geometry than either the metal or the dielectric material blade. It is possible to obtain elements corresponding to all optical counterparts.

The wave action device of the invention has hereinbefore been approached, with respect to its method of operation, as being set up to operate continuously. Such devices may however be designed to operate intermittently, thereby assuring radio links in situations where such links are obstructed by changes in the normal atmospheric conditions of the region. A link served by low, and therefore cheaper, towers may be unobstructed for the normal conditions of the atmosphere of the region. However, it may happen, with a change of atmospheric conditions and, therefore, of the refraction index of the atmosphere, that the link will become obstructed, that is, that the radio waves which previously reached the receiver cease to do so, due to the redirection imposed by the changed atmospheric conditions.

In the foregoing circumstances, a wave action device of the invention may be provided and installed in the region of the link, so that it operates only under normal atmospheric conditions. Accordingly, in normal circumstances, the "intermittent" device will operate little or not at all. With the change of atmospheric conditions, the radio waves which seldom or never reached the intermittent device, will start reaching said device and permit it to act to offset the losses incurred from the redirection of radio waves in consequence of the change in atmospheric conditions. In such application, the heights of the expensive towers of the terminal stations of a radio link may be substantially reduced if an auxiliary wave action device is provided at the link to operate intermittently.

Figure 10:
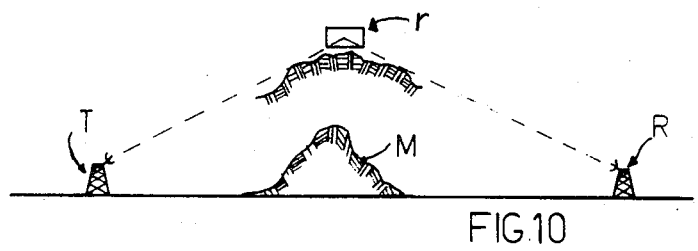
FIG. 10 is a schematic diagram illustrating the use of a reflector at a radio link.

The wave action devices of the invention may be used in association with reflectors. The use of reflectors is well known in telecommunications. The reflecting parabola of the antennae used in microwaves is an example of such use. There are also large-dimensioned flat reflectors, some measuring as much as 10 m by 12 m, constructed at elevated locations in the general area of the link, whence they reflect the electromagnetic beam. FIG. 10 illustrates the use of a reflector r operating as a mirror so as to reflect the waves transmitted from the transmitting station T to the receiving station R. The stations T and R are on a direct line of sight obstructed by a mountain M. One of the great advantages of the use of reflectors in conventional systems is the great distances they reach.

Figure 11:
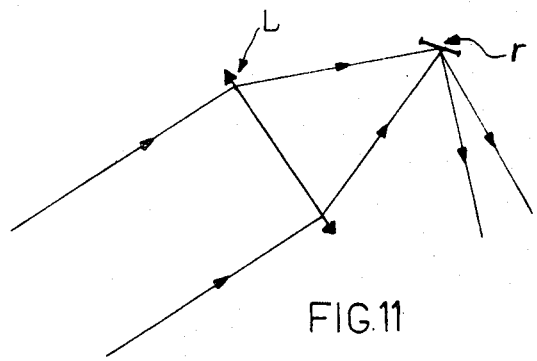
FIG. 11 is a schematic diagram illustrating, by analogy with geometric optics, the use of the wave action device of the invention, of the convergent lens type, in association with a mirror reflector.

FIG. 11 illustrates, by its optical counterpart, the effect of a wave action device operating as a convergent lens L on the electromagnetic beam to be picked by a reflector or mirror r. It is evident that if the convergent lens L device is removed, the reflector or mirror r will have to be much larger in order to catch the beam of waves. The economical advantages are great. The construction of a wave device is much simpler and cheaper than the construction and assembly of a large reflector. In addition, a small reflector is much cheaper in construction and installation. Being small-sized, the reflector offers a small area of resistance to the wind, requiring much more modest foundations and structures.

Other configurations and applications of the wave action device of the invention are hereinafter described.

Figure 12:
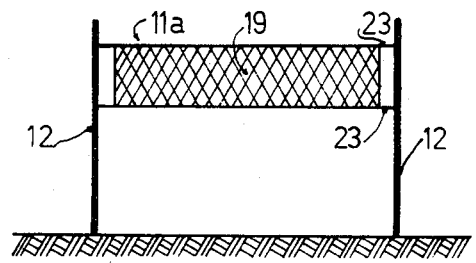
FIG. 12 is a view, on a reduced scale, of a metal screen blade of the device of the invention, showing a system for mounting such blade.
Figure 12A:
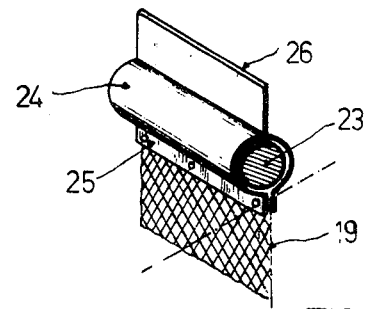
FIG. 12a is a perspective view, on an enlarged scale, of a metal screen blade of the device of the invention, illustrating a system for mounting such blade.

A satisfactory and original configuration of the device with blades 11a formed by metal screens for certain circumstances consists of affixing the screen 19 between two cables 23 affixed to the supports or towers 12, as shown in FIG. 12. The method of affixing the screen 19 to the cables 23 is illustrated in FIG. 12a and comprises the use of two continuous clamps 24. Each of the clamps 24 lodges and holds one of the side edges of the screen 19 between its continuous lugs 25. Each of the clamps 24 lodges one of the cables 23 in its tubular portion. Each clamp 24 has a longitudinal flange 26 essentially diametrically opposite its two lugs 25. The flanges 26 provide a "knife-edge" at the sides of the screen blade 11a.

Figure 13:
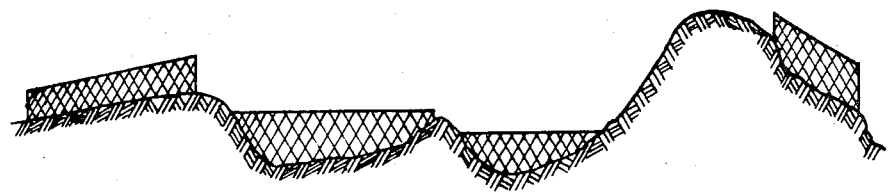
FIG. 13 is a schematic diagram illustrating the use of wave action devices of the invention positioned like a metallized fence.

The wave action device of the invention having solid or screen-type metal blades takes the form, in given circumstances, of a metallized wall of brick, stone, or even a metallized wooden fence, properly dimensioned and positioned, and having edges properly trimmed. Such a wave action device is shown in FIG. 13.

Figure 14:
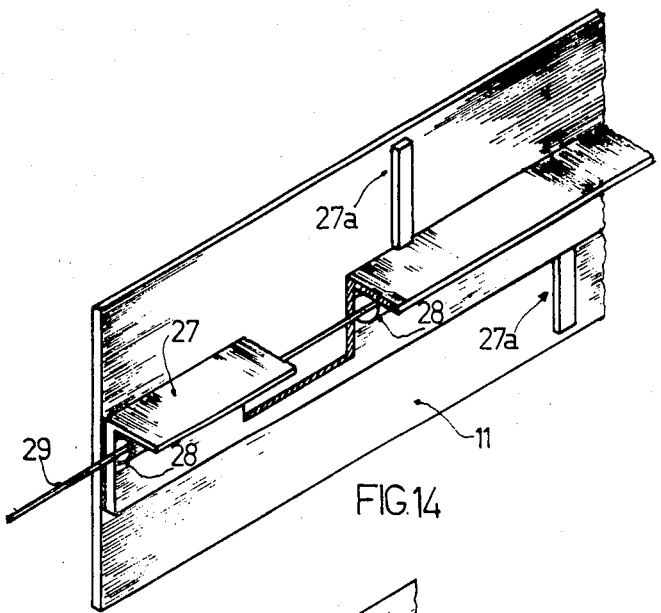
FIG. 14 is a perspective view, partly cut away and partly in section, on an enlarged scale, of part of a reinforced type of metal blade of the device of the invention.

With regard to mechanical performance, the wave action devices hereinbefore described will endure a great load produced by the wind. In such circumstances, the metal blades should be fitted with structural reinforcing elements to prevent deformation due to great bending and twisting. FIG. 14 illustrates, by way of example, a metal blade 11 fitted with an angle plate 27 welded longitudinally to one of the faces of said blade. Guide rings 28 are welded to the angle plate 27, internally, at the vertex of said angle plate. A cable 29 passes through the guide rings 28. Metal cross bars 27a are also provided and welded to the blade 11 and the angle plate 27. The blade of FIG. 14 is mounted between the supports or towers and cable 29 is made taut and affixed to said towers. In such an arrangement, the cable 29 functions as a check to the bending moment to prevent the blade from bending. The cross bars 27a limit the deformation of the blade by torsion.

The blades and supports may be ruggedly constructed, in various ways, to withstand the action of the wind. However, it is always advantageous to have a device which offers the least possible resistance to the wind.

Figure 15:
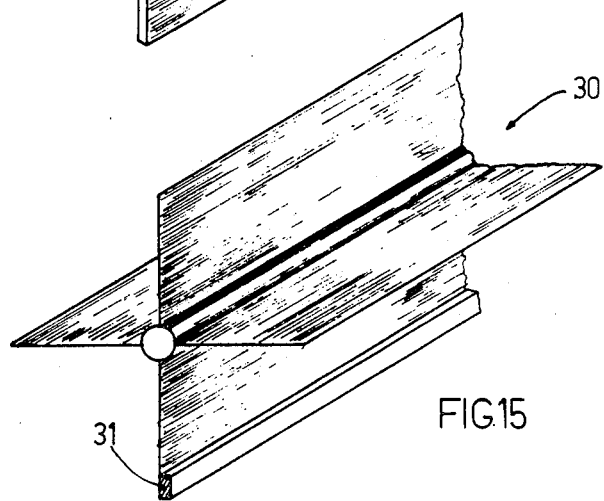
FIG. 15 is a perspective view, on an enlarged scale, of part of a wind-rotated metal blade of the device of the invention.

FIG. 15 illustrates a metal blade 30 made of four sheets or vanes angularly spaced 90° from each other. The blade is assembled between the towers or supports by any suitable means which enables it to rotate about an axis defined by the intersection of the planes of the vanes. The number of sheets or vanes may be greater than 4 in number and said sheets may be constructed of metal screen.

Rotation of the blade 30 does not significantly alter the electrodynamic performance of the wave action device, due to two features. The first feature is that the effective area, per blade, which prevents the passing of the electromagnetic waves does not vary much. When two coplanar vanes begin leaving the vertical position, two others begin to move into that position. The second feature is that there is normally a reasonable number of blades in a wave action device which will not rotate in synchronism, and an even smaller number of blades in synchronism. Thus, the fluctuation of the total effective area of the device tends to be minimal.

As shown in FIG. 15, one of the vanes may support an end counterweight 31. The counterweight 31 guarantees the normal position of a pair of vanes when there is no wind. This system of rotating blades has the great advantage of permitting the use of lighter and flimsier supporting structures.

The described devices require a strict location, permitting only a specific structural flexibility in the direction of propagation of the electromagnetic beam. The devices also have the capacity of deflecting the electronic beam sideways, so there is no need to locate a device on the line of sight of the terminal stations.

As hereinbefore mentioned, the dimensions of the blades, their spacing and their positioning are critical. The technique for computing these parameters provides the resultant device with a performance which is practically independent of variations of the index of refraction of the atmosphere.

Figure 16A:
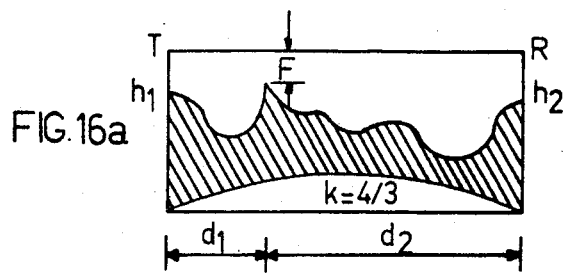
FIG. 16a is a graphical presentation of the effect of space release in the broadcasting of electromagnetic waves, depicting the "knife-edge" situation in a highly idealized manner.
Figure 16B:
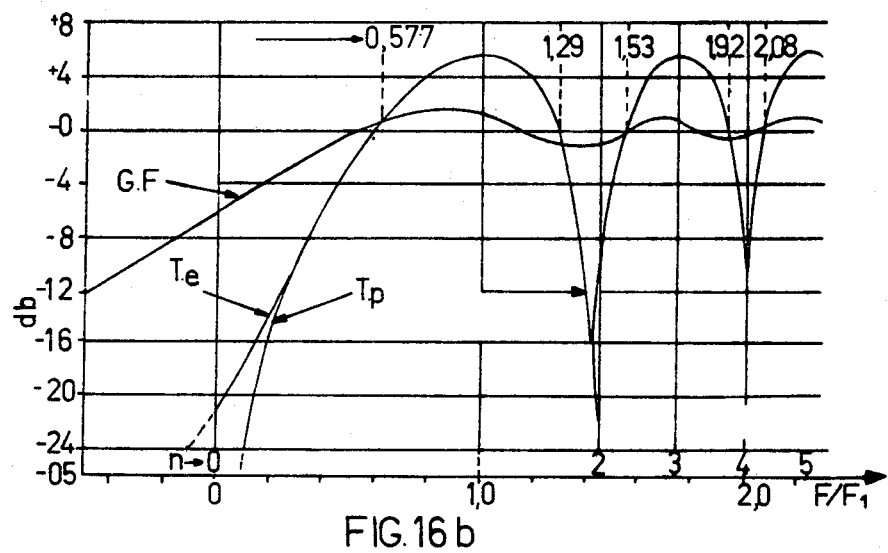
FIG. 16b is a graphical presentation of the effect of space release in the broadcasting of electromagnetic waves, showing the limits of physical reality via "knife-edge", "spherical Earth" and "flat Earth" curves.
Figure 16C:
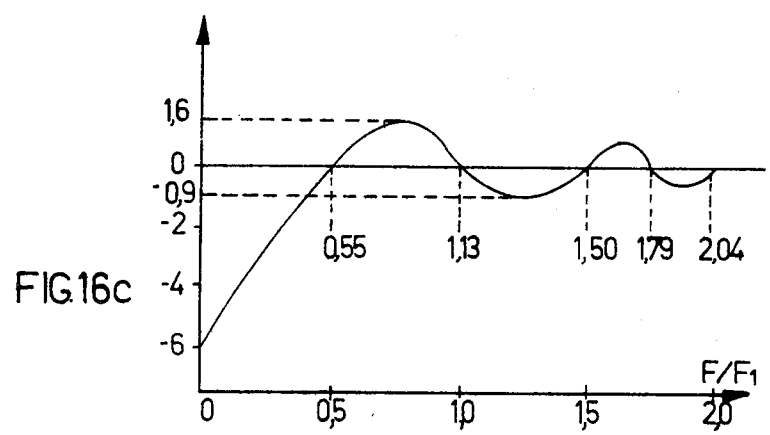
FIG. 16c is a graphical presentation of the effect of space release in the broadcasting of electromagnetic waves, illustrating a detail of the "knife-edge" curve.

The wave action device of the invention functions according to the principle of what is called in telecommunications parlance and in that of the theory of diffraction, a "knife-edge". An obstruction to the propagation of a beam of radio waves results in the introduction of a loss or an additional gain. The wave action device of the invention embodies the principle of the "knife-edge" curve. This principle was purely theoretical until the time of the present invention. The "knife-edge" curve does not have variations as sharp as those of the "round Earth" and "flat Earth" curves. The principle of the "knife-edge" curve is utilized to determined the ground clearance of the line of sight, as shown in FIGS. 16a, 16b and 16c. The following abbreviations, having the following meanings, appear in FIGS. 16a, and 16b and 16c.

T = transmitter
R = receiver
F = the ground clearance of the line of sight
$d_1$ and $d_2$ = distances from transmitter and receiver to the "knife-edge" point
$h_1$ and $h_2$ = heights of transmitter and receiver
dB = decibel
Fl = first Fresnel zone
Gf = "knife-edge" curve
$T_e$ = "spherical Earth" curve
$T_p$ = "plane Earth" or "flat Earth" curve
$n = (F/Fl)^2$ The ground clearance of the line of sight varies with atmospheric conditions, since such conditions refract the electromagnetic waves. This causes the waves to approach or move away from the surface of the ground. This is described by the so-called "K factor" which represents the phenomenon quantitatively. When the device of the invention is properly constructed, it simulates the "knife-edge" condition, making the link essentially indifferent to variation of the factor K.

An important problem, as hereinbefore pointed out, which the device of the invention overcomes is the action of the wind. This may be translated into a several tons load, since the physical area of the device may be hundreds of square meters in magnitude in the worst cases. The mechanical configurations shown in FIGS. 6 to 15, although they are illustrative, are not optimal for wind loading.

The embodiment of FIG. 12a is adequate within certain limits, for wind loading, since it utilizes a metal mesh having holes which permit an almost free flow of air.

The embodiment of FIG. 14 is also suitable, if made of high tensile metal permitting flection and especially permitting torsion around its longitudinal axis. This permits an adaptation to the wind loading, due to the minimization of the wind resisting area by the torsion. In this case, the reinforcements 27a of the embodiment of FIG. 14 should not be utilized.

The embodiment of FIG. 15 is also quite suitable to solve the wind loading problem. It can, however, be an expensive proposition.

FIGS. 17a to 17e show another embodiment of the mechanical configuration of the blades. The embodiment of FIGS. 17a to 17e has the following advantages. It minimizes the wind action on the blades. It gives the blades very high resistance to both flection and torsion. It minimizes loads transmitted to the supporting towers or other structures of the device. It introduces a fail safe characteristic to the device.

In the embodiment of FIGS. 17a to 17e, the blade 40 is formed by two similarly shaped blades 42 and 43 (FIG. 17a) in order to minimize wind loading. A saving of material is achieved by making the two blades 42 and 43 of different widths. The blades 42 and 43 are joined by rivets 44 (FIG. 17a). The basic blade of the wave action device is therefore hollow, as shown in FIGS. 17a and 17c. This maximizes its resistance both to flectional and torsional loads.

The blades 40 are not rigidly affixed to the towers or other supporting structures. Instead, supporting structures 50 (FIG. 17c) are affixed to the towers via bolts, pressure washers and nuts. The supporting structures 50 are so dimensioned that they fit snugly within the hollow blades 40 of the device (FIG. 17c). The supporting structures 50 are usually, but not necessarily, made of steel. The blades 40 may be made of aluminum. Since the contact of aluminum and steel is not recommended, Nylon washers 52 are mounted on the supporting structures, as shown in FIGS. 17d and 17e. The washers 52 may be of any suitable material other than Nylon. The washers 52 are affixed to the supporting structure 50 by adhesive, rails, or screws 53 and nuts 54 and pressure washers 55, as shown in FIG. 17e.

The Nylon washers 52 also decrease the friction between the blades 40 and blade-connecting members 51.

The blade 40 of the embodiment of FIGS. 17a to 17e is essentially free from the towers, since it is able to slidably move over the Nylon washers 52. In this manner, the blade 40 adapts to stresses and strains. This minimizes all stresses and strains throughout the structure.

If the wind loads are extreme, the blade 40 will snap off the supporting hand-like structures, but will be prevented from flying away by an internal cable 58 (FIG. 17b) acting as a failsafe device. The blade 40 will thus be free to rotate, so that an exceptional wind load will never be transferred to the towers.

The wave action device of the invention may be used to increase the gain of antennae of radio links. The antennae at the terminal stations in radio links may have their gains, or directivity of efficiency of radiation in a particular direction, substantially increased by simply installing the wave action device at a nearby distance, alongside the main direction of radiation. This distance is typically a few hundred meters long. Care must be taken that the wave action device is in a "distant field condition", which is a condition characterized by both the frequency of the radiation as well as the dimensions concerned.

Figure 18:
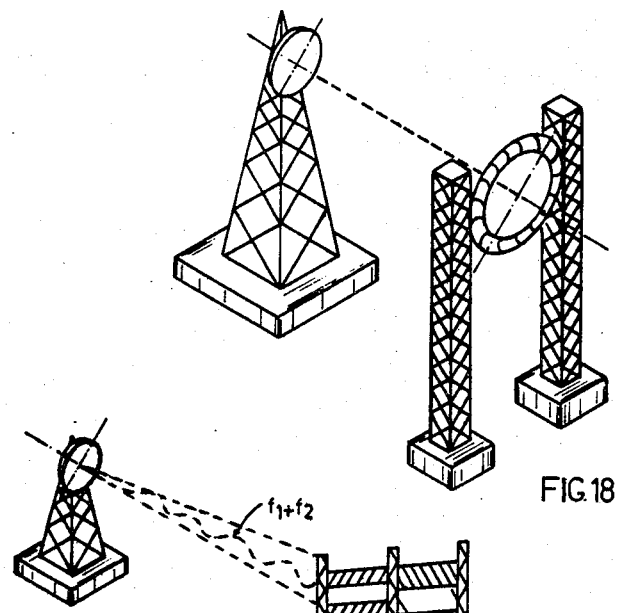
FIG. 18 is a schematic diagram illustrating the use of the wave action device of the invention for increasing the gain of antennae of radio links.

If the antennae are parabolic, such as those used in microwave transmission, the device is preferably constructed as several concentric rings. Each ring increases the power gain of the antenna by factor of four, at most, when the wave action device has screen type blades. The increase in power gain is even greater when the wave action device has blades of dielectric material. The concentric ring embodiment is illustrated in FIG. 18.

For radio links subjected to strong attenuation of signals due to rain and/or fog, the concentric ring device, applied with one or more rings to either or both terminals of the radio link, very economically increases the signal intensity sufficiently to compensate for the rain and/or fog attenuation. In proper circumstances and care the concentric ring type device of the invention may also be used in the set antenna/passive reflector when the antenna and reflector are in a periscope type arrangement. In such an arrangement, the antenna is at the foot of a tower, the reflector is at the top of the tower and the device is inbetween the antenna and the reflector.

Figure 19B:
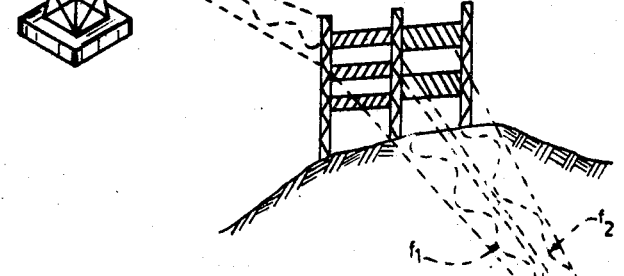
FIG. 19b is a schematic diagram showing the use of the wave action device of the invention as a multifocal lens.
Figure 19A:
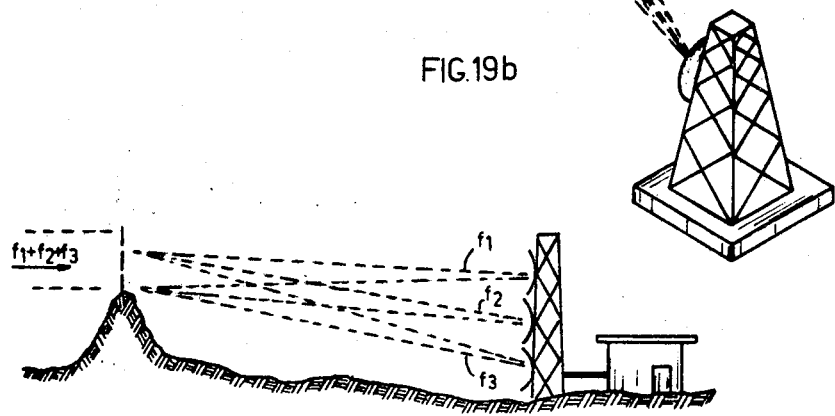
FIG. 19a is a schematic diagram showing the use of the wave action device of the invention as a multifocal lens.

The wave action device of the invention may also be used as a multifocal lens. The focussing property of the device depends upon the frequency of the signal being processed. In this manner, a single wave action device may be used to focus signals of different points in the same vertical plane, as illustrated in FIG. 19a.

If no height clearance is available at the station tower, the wave action device of the invention may be built as a multi-foci lens, a bifocal being the simplest case. In this case, the wave action device is simply the consolidation of two or more wave action devices into a single structure, illustrated in FIG. 19b.

The following example of the structure and operation of the wave action device of the invention utilizes electromagnetic waves for illustrative purposes only, due to the popular application of such waves in telecommunications. Accordingly, the basic theory of operation of the wave action device of the invention is confined to electromagnetic terms and circumstances. It is emphasized, however, that this is incidental. The device of the invention is a wave device. No basic electromagnetic phenomena is required to support its operation, except for the fact that a suitable wire mesh may bar a radio frequency or rf wave. Other, different, materials block other types of waves such as, for example, acoustical waves. Selective and appropriate blockage is all that is required.

The basic theory of operation is just Huyghen's theorem of wave propagation, as modified by Kirchhoff-Fresnel, which applies to waves in general, its physical intrinsic nature not withstanding. A surface S is considered to be any imaginary surface immersed in the field of a wave in a manner whereby the field of the wave at each point of S has a specific magnitude F and phase $\phi$. The field at a point P not belonging to the surface S, is defined as (FIG. 20)

$$F(p) = \frac{1}{4\pi} \int_S \left\{ \left[ \frac{e^{-ikr}}{r} \right] \frac{jF(p)}{jn} + \right. \quad (1)$$

-continued
$$\left. F(p) \frac{j}{jn} \left[ \frac{e^{-ikr}}{r} \right] \right\} ds$$

It is clear from Equation (1) that a suitable choice of S, and consequently of the values F(p) for a given original source of the beam, permits F(P) to assume a wide range of pre-assigned values.

The wave action device of the invention is a materially feasible realization of the theorem of wave propagation, also taking into consideration other factors such as, for example, the K factor in the case of electromagnetic waves, occurring in nature. The device of the invention does not depend upon the specific nature of the wave.

A typical telecommunication problem situation is the case of a link being greatly obstructed. The solution of this problem by the wave action device of the invention is described in the following specific example. The device of the invention in telecommunications may be treated as a limiting case of two back-to-back antennae.

In the systems engineering of the basic wave action device, the ability to provide real gain and to redirect a microwave beam are the features of said basic wave action device which raise the most questions. These questions do not arise for reflectors, since mirrors are an everyday experience for everyone. The wave action device, on the other hand, is not commonplace at all, and there is no daily experience with it.

The working principle of electromagnetic lenses, of which the wave action device of the invention is but one, albeit important, case, is as follows, using a system point of view. Basically, the wave action device may be thought of as a limiting case of two back-to-back antennae. The redirectioning of the beam from direction 1 to direction 2 is achieved by the device through controlled interference. This is illustrated in FIGS. 21a and 21b.

The back-to-back antenna system, as a whole, contributes a 2GdB gain to the link. The wave action device of the invention provides the same gain. The wave action device may thus be dimensioned in very much the same way as a back-to-back system.

A worse condition is assumed in an example in which the wave action device of the invention is positioned at the mid-point of a 50 km link, with f=8 GHz. TX power is 30 dBm. The receiver threshold is −75 dBm. The margin of fading should be at least 35 dB. The wave action device is at the top of a 1000 m midlink obstruction. The specific wave action device required is determined as follows.

If there were no obstruction, so that no wave action device would be required, six foot antennae could be used at the receivers. If miscellaneous losses of 6dB are assumed, the received signal would be at −38.1 dBm corresponding to a 36.9 dB margin of fading. This would satisfy the requirements. Since there is an obstruction, antennae with 10 foot diameters could be used, thereby accruing a 8.6 dB total advantage. This is a reasonable engineering move. In addition, it is possible to expect savings of at least 1.4 dB in waveguide losses by lowering the antennae, since the antennae do not have to be high up when the wave action device of the invention is used. This is a very conservative estimate. Such savings in waveguide loss could easily run as high as 7 dB.

With these moves accomplished, what is needed is a wave action device having a 2 GdB gain, so that by functioning as a back-to-back antenna system it will guarantee the original −38.1 dBm signal. The power balance equation for this configuration is $$-38.1 = \underbrace{30 \underset{TX}{} - 2.3 \underset{Guide}{} + 45.5 \underset{Ant}{} - 138.5 \underset{\substack{Free\ Sp.\\Loss}}{} + G_D \underset{Device}{} +}_{\text{first leg}} \quad (2)$$

$$\underbrace{- 2.3 \quad + 45.5 \quad - 138.5 \quad + G_D}_{\text{second leg}}$$

This results in $$G_D = 61.25 \text{ dB} \quad (3)$$

If actual parabolic antennae were used to implement the back-to-back configuration, they would require diameters larger than 60 feet. This is practically impossible. Wave action devices with this type of gain, however, are easily constructed. A great advantage of the wave action devices is that they bypass the mechanical impossibility posed by very large diameter parabolic antennae and are of practicable size. The wave action devices of the invention are thus also known as super gain antennae.

The geometric area of the screen of the wave action device can be shown to be given by $$G_{dB} \cong 9.031 - 20 \log \lambda + 10 \log A_{geom} \quad (4)$$

from which $$A_{geom} \cong 234 \text{ m}^2 \quad (5)$$

This is a perfectly viable device. It would consist of metal strips about 22 m long, and with their mutual spaces and widths adding to about 23 m. The entire lens could be kept in place by three 39 m guyed towers, as illustrated in FIG. 22.

The primary advantage of the aforedescribed procedure for dimensioning the wave action device is that it bears entirely on the well known and familiar back-to-back antenna system. A more direct method utilizes the expression.

$$A_{geom} = F(1 - F)\frac{R'^2}{R} \frac{\lambda}{2} \pi \sqrt{\alpha} \quad (6)$$

where the symbols are those of FIG. 23 and $\alpha$ is the attenuation, that is, the ratio of the desired received signal to the signal received under free space conditions, all other conditions remaining the same.

Thus, in the example, the desired received signal is −38.1 dB whereas in free space conditions it would be −28.1 dB. Hence $\alpha = -10$ dB or $\alpha = 1/10$. The expression for $A_{geom}$ will then be $$A_{geom} = \tfrac{1}{2}[1 - \tfrac{1}{2}]\frac{50040^2}{50000} \times \frac{0.0375}{2} \pi \sqrt{0.1} \quad (7)$$

or, as before, $$A_{geom} \cong 234 \text{ m}^2 \quad (5)$$

It is very revealing to extend the comparison between the back-to-back antenna systems and the wave action devices to economic areas.

The wave action device of the invention performs the same function as a back-to-back antenna system. More specifically, it redirects the beam and furnishes gain to the signal. Hence, from a system point of view there is no basic difference between the device and the antenna system. The reason for the use of the wave action devices is simple and purely mechanical. Parabolic antennae hardly achieve gains much above 40 dB. Furthermore, at this level they are already enormous. For 7.5 GHz, a 15 foot parabola has a 48.5 dB gain. To increase this gain by just 3 dB, the parabola diameter has to be increased to 21 feet, and so on. As the diameter increases, the price of the antenna increases exponentially.

If an actual back-to-back system were to be used, parabolic antennae having diameters greater than 60 feet would be required, since G=61.25 dB for f=8 GHz. This assumes that a 55% efficiency can be maintained for all diameters, which is a difficult proposition. In addition, the supporting structure for complying with the rigidity requirements of such a system would be considerable. The same problems and hardships facing the back-to-back system would have to be faced by a reflector system of the billboard type. The reflector would have to be huge, to maintain its surface flatness, regardless of conditions, and would have to satisfy tremendous structure rigidity requirements.

None of the aforedescribed difficulties would affect the wave action devices of the invention. Operating under interference principles, the wave action devices avoid all the mechanical problems which must be resolved by parabolic antennae and billboard reflectors. Furthermore, the wave action devices of the invention have two technical advantages over parabolic back-to-back antennae, billboard reflectors, and even active repeaters. The first advantage is that the wave action device of the invention provides virtual independence of the K factor for the link due to its multiple "knife-edge" nature. The second advantage is the non-rigidity requirements for the supporting structure of the wave action device. The device may be placed high up. A billboard reflector or large parabolic antennae cannot be placed high up. The wave action device thus offers a flexibility for the solution of link problems which the reflectors and parabolic antennae do not.

The dimensioning and positioning of the blades and the K control feature of the wave action device must be determined. The Example is schematically shown in FIG. 24. The wave action device will have several blades. The vertical dimensions of the blades may be determined to a first approximation as follows, and as shown in FIG. 25.

The set of blades defines a set of apertures. The first aperture is between the ground and the lower edge of the lowest blade. The last aperture is all of the space above the upper edge of the highest blade. The other apetures of the set are those between the upper edge of any one blade and the lower edge of the blade immediately above it.

Since the transmitter T is sufficiently far away, the wave front will be essentially planar and the phase shift from one aperture to the next will be $$\sim \frac{\delta}{\lambda} 2\pi \sim \frac{2\pi}{\lambda} 2a \sin \theta_1 \tag{8}$$

The wave action device will radiate into the semi-space Z>0, at an angle θ with the y axis. As well known from the theory of linear antenna arrays, there will be a family of equal amplitude lobes defined by $$\psi = \frac{2\pi}{\lambda} d \cos\theta - \Delta\phi = K 2\pi \tag{9}$$

wherein $K = 0, \pm 1, \pm 2, \ldots$, d is the constant space separation between consecutive elements and $\Delta\phi$ is the constant phase separation between consecutive elements. In the present case, $d = 2a$ and $\Delta\phi \sim (2\pi/\lambda) 2a \sin \theta_1$. The lobes will be duly modified by the radiation pattern of each single aperture, but it is possible to produce a very sizeable lobe directed towards R by judiciously selecting the parameter "a". In particular, by selecting $$a \sim \tfrac{1}{2} \frac{\lambda}{\sin\theta_1 + \sin\theta_2} \tag{10}$$

it follows from Equation (9) that $$\psi = 2\pi \frac{\cos\theta - \sin\theta_1}{\sin\theta_1 + \sin\theta_2} \tag{11}$$

The lobe that will reach R is defined by $K = -1$. That is $$\psi = -2\pi \tag{12}$$

since Equation (11) then becomes $$\frac{\cos\theta - \sin\theta_1}{\sin\theta_1 + \sin\theta_2} = -1 \tag{13}$$

$$\cos\theta = -\sin\theta_2 \tag{14}$$

$$\theta = \frac{\pi}{2} + \theta_2 \tag{15}$$

This is the direction towards R as seen from the wave action device.

All lobes may be intensified by simply increasing the number of apertures. This is due to the fact that the power supply to the array is just the incident wavefront originating from the transmitter T, so that the increase in the number of apertures will not decrease the magnitude of power supplied to each one of them. The increase is defined as 20 log N (powerwise). The lobe reaching R can therefore be as intense as desired. The wave action device redirects the beam and provides gain.

The width of the blades and the spaces between them will thus be approximately $$a \sim \tfrac{1}{2} \frac{0.04}{0.04 + 0.04} \sim 0.25 \text{ m} \tag{16}$$

With this data and the previous data results, the device may be easily constructed by anyone ordinarily skilled in the art.

The influence of the variations in atmospheric refractivity, described in telecommunications as the K factor variation, is indicated by variations in the parameter b (FIG. 24), which is the measure of the Earth bulge.

The dimension b in meters is determined by $$b = 0.0785 \frac{d_1 d_2}{K} \tag{17}$$

wherein b is in meters and $d_1$ and $d_2$ are in kilometers. It follows that $$b_{K=4/3} \sim 36 \text{ m} \tag{18}$$

$$b_{K=\frac{2}{3}} \sim 72 \text{ m} \tag{19}$$

These values directly influence the measure of the obstruction. In the Example, it is stated for what value of K the 1000 m obstruction occurs. It is assumed that it was for $K = 4/3$. Hence for $K = \frac{2}{3}$ the obstruction will become $1000 + 36 = 1036$ m. This is a 3.6% increase, and will hardly affect the dimensions of the wave action device.

The situation is the basis for one of the techniques for the control of K by the wave action device. The wave action device of the invention should be installed at such an altitude as to make the b, and therefore the K, variations negligible. The local topography may not be suitable for this. In such case, there are several possible recourses.

One solution is the use of high towers. If, for example, the topography were completely smooth, which would be the worst case, the following artifice would be used. The wave action device would be placed off the direct line interconnecting the stations by 1 km, for example. The blades of the wave action device would be positioned conveniently inclined so that the plane formed by the line interconnecting the transmitting and receiving stations T and R, respectively, and the signal waves to the device from these stations, which originally was vertical, is then inclined. The blades remain perpendicular to this plane in its new position and are therefore inclined. In this manner, the 1000 m obstruction is again simulated and the original situation may be recreated. However, care must be used in determining minimum tower heights. There are also other considerations pertinent exclusively to radio transmission engineering, as illustrated in FIGS. 26a and 26b.

In the off-line of sight situation only the y component of the 1000 m obstruction would be influenced by K, and it would be very easy to select the point D' so that $y \ll 1000$ (FIG. 26a). Hence, in this sense, this is an even more favorable situation.

There are still other ways to make the wave action device of the invention rather insensitive to the K factor. One method is to design a set of blades for a value of K, another set for another value of K, and so on. For a discrete set of Ks covering a given range such as, for example, $K = 4/3$ to $K = \frac{2}{3}$ a total radiation pattern would be provided which would always reach the receiver R and always be reached by the transmitter T. The analogy to optics is found in the bifocal, trifocal, etc., lenses.

The last technique may provide a wave action device which is too large. An alternate method is to use more than one antenna at the receiver R, the transmitter T, or both. Thus, the obstruction $\Delta H$ remains the same for $K_1$ and $K_2$ if the proper pair of antennae is considered, as shown in FIG. 27. This technique may be generalized to use more than two antennae. It may also be combined with the aforedescribed techniques.

In addition to the K control techniques, it is observed that if the wave action device is constructed of only one blade, conveniently long and properly shaped, it will act, in addition to the aforedescribed characteristics, as a "knife-edge". As a "knife-edge", the wave action device intrinsically renders the link essentially independent of variations in the K factor, as hereinafter described.

The wave action device of the invention wil stabilize the beam with respect to fluctuations in the refractive index. It has been explained in the Example how insensitivity to K fluctuations could be achieved. Furthermore, the one blade configuration of the wave action device has an intrinsic K stabilizing feature due to its "knife-edge" nature, regardless of its length. This is hereinafter clarified. The operation of the wave action device of the invention may be supported by a generalization of the "knife-edge" theory.

Figure 28:
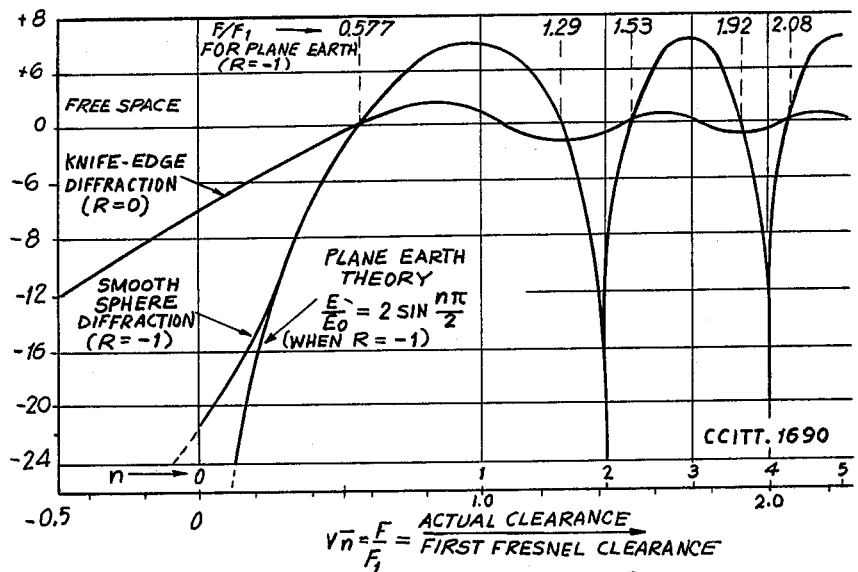
FIG. 28 is a graphic presentation of loss versus clearance curves portraying different types of obstacle geometry.

The K-stabilization of a microwave beam by use of a "knife-edge" shaped obstacle is most readily seen from the loss versus clearance curves shown in FIG. 28. The CCITT curves of FIG. 28 portray three types of obstacle geometry. These are the "knife-edge", the flat obstacle or "plane Earth" and the round smooth type or smooth sphere diffraction. The abscissa represents the clearance and the ordinate represents the free space loss.

The curves of FIG. 28 indicate that the influence of the K variation, which implies a variation of the clearance over the obstacle, will have quite a different impact, depending upon which curve is being followed. It is also obvious that the "knife-edge" curve is the most stable one. Hence for a K variation which causes a clearance variation from $F/F_1=1$ to $F/F_1=0$, the "knife-edge" curve shows a loss of only 6 dB, against a loss of 22 dB for the smooth sphere diffraction and total disappearance of the signal for the plane Earth theory.

Athough the curves of FIG. 28 are widely and traditionally well known and are published by the CCITT, they are used just to estimate obstruction loss by existing natural obstacle. An artificial structure is installed over a natural obstacle to form a single obstacle with a "knife-edge" nature thereby attaining the aforementioned K-stability.

Figure 29:
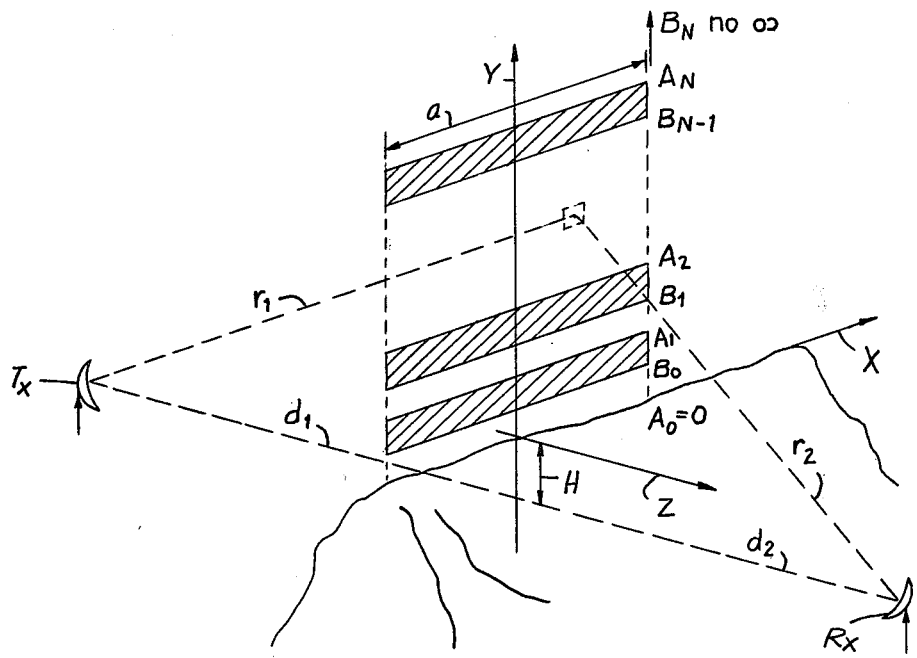
FIG. 29 is a schematic diagram of a diffractor in its simplest geometry.

The classical theory of "knife-edge" diffraction is well known, and is found in many standard texts on optics. This theory may be generalized for the situation shown in FIG. 29. FIG. 29 represents a diffractor in its simplest geometry. In this case, the diffractor functions as a multitude of "knife-edges".

If $P_T$ is the transmitted power and $G_T$ is the transmitter antenna gain, $$E_i(x,y) = \frac{\sqrt{3oP_TG_T}}{r_1} e^{-ikr_1} \quad (20)$$

with $$r_1 \sim d_1 + \frac{x^2 + (y+H)^2}{2d_1} \quad (21)$$

then $$E_i(x,y) \sim \frac{\sqrt{3oP_TG_T}}{d_1} e^{-ikd_1} e^{-ik\frac{x^2+(y+H)^2}{2d_1}} \quad (22)$$

The field at the receiver $E_R$ is then calculated by $$E_R \sim \frac{i}{\lambda} \int_S E_i(x,y) \frac{e^{-ikr_2}}{r_2} dS \quad (23)$$

or $$E_R \sim \frac{i\sqrt{3oP_TG_T}}{\lambda d_1 d_2} e^{-ik(d_1+d_2)} \int_S e^{-ik\frac{d_1+d_2}{2d_1d_2}[x^2+(y+H)^2]} dS \quad (24)$$

The received power $P_R$ at the receiver $R_X$ is then given by $$P_R \sim \frac{3oP_TG_T\lambda^2G_R 4\pi(d_1+d_2)^2}{12o\pi\lambda^2 d_1^2 d_2^2 (4\pi)^2 (d_1+d_2)^2} \left| \int_S e^{-i\frac{\pi}{\lambda}\frac{d_1+d_2}{d_1d_2}[x^2+(y+H)^2]} dS \right| \quad (25)$$

It is observed that $$\alpha_0 = \left[ \frac{4\pi(d_2+d_2)}{\lambda} \right]^2 \quad (26)$$

which is the link free space loss.

$$F_1 = \sqrt{\frac{\lambda d_1 d_2}{d_1+d_2}} \quad (27)$$

which is the radius of the first Fresnel zone.

Hence, the attenuation factor for the diffractor served link will be $$\alpha = \frac{P_T}{P_R} = \frac{\alpha_0 \cdot \alpha_{additional}}{G_T G_R} \quad (28)$$

wherein $$\alpha_{additional} = \frac{F_1^4}{\left| \int_S e^{-i\frac{\pi}{F_1^2}[x^2+(y+H)^2]} dS \right|^2} \quad (29)$$

$\alpha_{additional}$ may then be written in the form $$\alpha_{additional} = \frac{\alpha_{knife-edge}}{G_D} \quad (30)$$

wherein $\alpha_{knife-edge}$ is well known from the literature $$\alpha_{knife-edge} = \frac{2}{\left| \left[ \frac{1}{2} - C\left(\frac{\sqrt{2}H}{F_1}\right) \right] - i\left[ \frac{1}{2} - S\left(\frac{\sqrt{2}H}{F_1}\right) \right] \right|^2} \quad (31)$$

wherein C and S are the classical Fresnel integrals.

Hence $$G_D = \frac{2\left|\int_S e^{-i\frac{\pi}{F_1^2}[x^2+(y+H)^2]} dS\right|^2}{F_1^4 \left|\left[\frac{1}{2} - C\left(\frac{\sqrt{2}\,H}{F_1}\right)\right] - i\left[\frac{1}{2} - S\left(\frac{\sqrt{2}\,H}{F_1}\right)\right]\right|^2} \quad (32)$$

The link attenuation is thus described as the attenuation caused by the knife-edge, which is a knife-edge, modified by a factor $G_D$, which may be called the diffractor's gain with respect to the knife-edge.

The integral $$\left|\int_S e^{-i\frac{\pi}{F_1^2}[x^2+(y+H)^2]} dS\right| \quad (33)$$

corresponds in FIG. 29 to the evaluation of $$\left|\int_{-a/2}^{a/2} e^{-i\frac{\pi x^2}{F_1^2}} dx\right| \cdot \left|\sum_{p=0}^{N} \frac{B_p}{A_p} e^{-i\frac{\pi}{F_1^2}(y+H)^2} dy\right| \quad (34)$$

The second factor is the summation of all the windows of the diffractor. This is the connection to the knife-edge theory. The first factor is the antenna array factor. This is the connection to the theory of the diffractor considered as a particular antenna array.

The devices of Kock, U.S. Pat. No. 2,577,619 are not knife-edge devices and cannot provide the K stabilization feature.

The particular positioning and spacing of a particular disclosed embodiment of the wave action device of the invention permits its operation as an electromagnetic lens at a location which is remote from the source of the beam. The devices of the aforedescribed Kock patent cannot be used for this purpose. The embodiment of the wave action device discussed with regard to the Example functions as an electromagnetic lens. This is due to the fact that the selective and appropriate blockage of parts of the incident beam by the wave action device is tantamount to changing the local phase of points in a wave front.

As hereinbefore described, the appropriateness of the blocking is established by the particular positioning and spacing of the blades. In accordance with the general wave theorem of Huyghens, as formulated by Kirchhoff, this redirects the beam and provides focussing. All electromagnetic lenses may be developed entirely from one or another version of Huyghens-Kirchhoff's theorem. The wave action device of the invention thus operates as an electromagnetic lens.

The wave action device of the invention functions as an electromagnetic lens despite its remoteness from the source of the beam. Actually, it is under this condition that the embodiment of the wave action device discussed with regard to the Example operates. The theory for this remote situation is most clearly illustrated in FIGS. 30 and 31.

Figure 30:
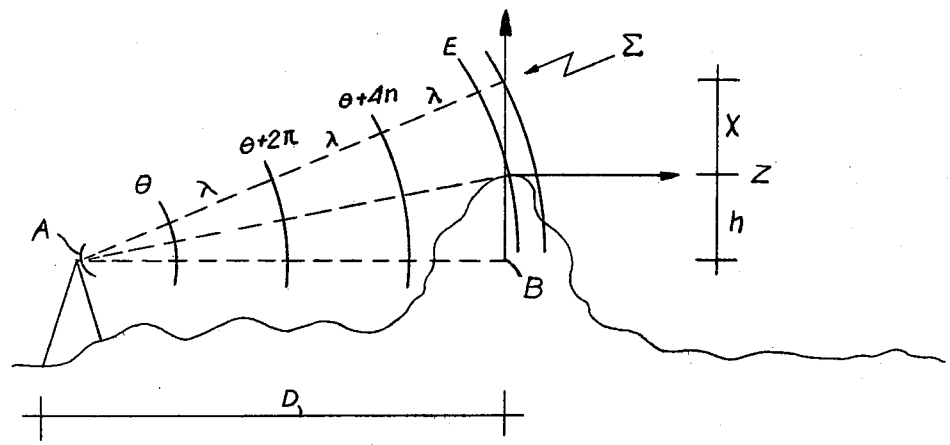
FIG. 30 is a schematic diagram illustrating the operation of the wave device of the Example as an electromagnetic lens remote from the source of the beam.
Figure 31:
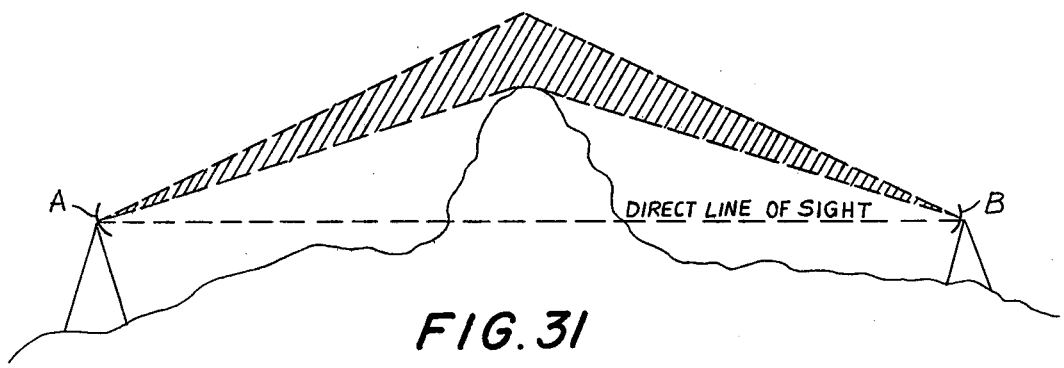
FIG. 31 is a schematic diagram illustrating the operation of the wave action device of the Example as an electromagnetic lens remote from the source of the beam.

As shown in FIGS. 30 and 31, the wave action device is installed over the obstacle at a site remote from the source A of the beam. The sphere E is a wave front which strikes the obstacle, and eventually the wave action device, as shown in FIG. 30. The phase $\theta$ of the wave of the sphere is constant. However, in the plane $\Sigma$, defined by $z=0$, the phase is by not at all constant (FIG. 30). In fact, if the point B is understood to be the zero value reference phase, the phase distribution along x, in the plane $\Sigma$, is defined as $$\phi \sim \exp(-ik(h + x)^2/2\,D) \quad (35)$$

wherein $k = 2\pi/\lambda$, $\lambda$ is the wavelength, and the time variation of the wave field is assumed to be exponential (i wt) with $\omega = 2\pi c/\lambda$, c being the speed of propagation of the wave and $i = +(-1)^{\frac{1}{2}}$.

It is thus clear that the phase distribution in the plane $\Sigma$ being as hereinbefore described, all possible phases of interest are available in said plane. if $\Sigma$ were a metal screen the entire signal would be blocked. This could be considered as a complete equalization of the phases of the wave field, which would incidentally have zero intensity. However, if suitably located and dimensioned windows were to be opened in $\Sigma$, they would establish over $\Sigma$ a surface with a desired phase distribution as well as an amplitude distribution, essentially unaffected at the window spaces, and with zero value at the metal blocking blades. This situation according to Huyghen's theorem, as modified by Kirchhoff-Fresnel, permits the beam to be redirected to any preselected direction. Since the intensity of the redirected beam is dependent upon the number of windows, or spaces defined by the blades, the beam intensity may also be controlled. In this manner, both redirectioning and gain, or focussing, are obtained. The wave action device of the invention thus functions as an electromagnetic lens at a location which is remote from the source of the beam.

The devices of the aforedescribed Kock patent, like any other electromagnetic lens, as hereinbefore discussed, operate by introducing local changes of phase in a wave front by the use of natural and/or artificial dielectric material and/or waveguide collections properly shaped and positioned in space. The devices of the aforedescribed Kock patent do not operate on blockage, unless this is considered to be but a limiting and drastic form of local phase modification, and, primarily are not at all suitable to operate at sites remote from the source of the beam. This is due to the following reasons. First, the structure of the Kock device would be very large and impractical. Second, the phase modification technique of Kock consists of having different parts of the wave front travel along different lengths, not through different widths, of his lens. The lengths are then critically dimensioned. This is not feasible at a remote site location where imprecision in the determination of all the distances would obviate any and all precision requirements for the lengths of the Kock device. In contradistinction, the critical parameter of the wave action device of the invention is the width and spacing of the blades. These are measurements taken transversely to the direction of the wave propagation, and not alongside it. This permits precise dimensions to be established for remote locations of the wave action device. This fact permits the feasibility of the aforedescribed theory.

The wave action device of the invention may be constructed to balance variations in refractive conditions in the atmosphere, usually described in telecommunications as the K factor of connection of Earth's curvature, which will vary the equivalent relative position of the wave action device with respect to the end terminal stations. The devices of the aforedescribed Kock patent cannot balance such variations. In fact, Kock did not have to face this problem, since his lenses are installed very near the source of the beam and form a single complex with said beam. Kock did not consider the problem of designing remotely installed lenses.

Figure 32:
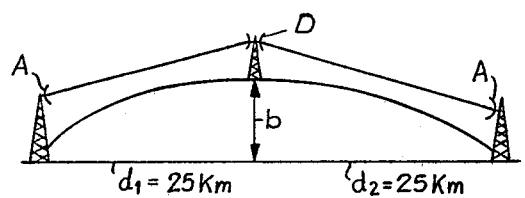
FIG. 32 is a schematic diagram illustrating the seriousness of the problem of defocussing.

FIG. 32 illustrates how serious the problem of defocussing can be. In FIG. 32, the source $A_1$ of the signal is an antenna and the receiver $A_2$ is an antenna. The wave action device D is halfway between the antenna $A_1$ and the antenna $A_2$.

The bulge b of the Earth's curvature, shown in FIG. 32, is defined as $$b = 0.0785 \frac{d_1 d_2}{K} \tag{17}$$

Since K ranges typically from $\frac{1}{3}$ to 4/3 or above, $$b_{4/3} = 36.8 \text{ m} \tag{36}$$

and $$b_{\frac{2}{3}} = 73.6 \text{ m} \tag{37}$$

This may not seem to be much, but in wavelengths it is a sizeable change. This is shown by $$\overline{A_1 D_{4/3}} = \sqrt{25^2 + 0.0368^2} \sim 25\left[1 + \tfrac{1}{2}\frac{0.0368^2}{25}\right] \tag{38}$$

$$\overline{A_1 D_{\frac{2}{3}}} = \sqrt{24^2 + 0.0736} \sim 25\left[1 + \tfrac{1}{2}\frac{0.0736^2}{25}\right] \tag{39}$$

$$\overline{A_1 D_{\frac{2}{3}}} - \overline{A_1 D_{4/3}} = 2.03 \text{ m} \tag{40}$$

For f=7.500 GHz, corresponding to $\lambda \sim 0.04$ m, this length difference would correspond to a continuous phase variation of $$\frac{2.03}{0.04} \times 360° = 18270 \text{ degrees} \tag{41}$$

This may be controlled by specially incorporated features of the wave action device of the invention, as hereinbefore described. It would be very difficult, if not impossible, to extend these techniques to the devices of the aforedescribed Kock patent. This has not yet been done.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A wave action device for a wave beam emitted from a source, said wave action device operating as a lens at a relay station remote from said source of said beam to redirect the beam in selective high concentration of said beam to one or more specific points, said wave action device being positioned in the region of a wave link at the remote relay station, said wave action device comprising a pair of spaced supports; intercepting means for intercepting the beam to eliminate that portion of said beam which forces the appearance of a null field at selected points of reception, said intercepting means comprising elongated spaced blades of predetermined dimensions positioned in a plane substantially transverse to the direction of propagation of said beam, said blades having spaces of predetermined dimensions between them, each of said blades having a side knife-edge, spaced opposite ends and a longitudinal axis extending therebetween, each of said blades having a width of a dimension determined by the operating characteristics of said device, said spaces having dimensions determined by the operating characteristics of said device;

modifying means for modifying the phase and the amplitude of the remaining portion of the intercepted beam to redirect said remaining portion of said beam in a passive manner, said modifying means selectively concentrating and diverging said remaining portion of said beam with respect to said selected points of reception, said modifying means comprising said spaces and said knife-edges of said blades for modifying the phase and the amplitude of said remaining portion of said beam; and mounting means mounting said blades at their ends on said supports in a manner whereby said blades are adjustably inclinable relative to horizontal.

2. A wave action device as claimed in claim 1, wherein said mounting means mounts said blades on said supports in a manner whereby said blades are collectively adjustable relative to horizontal about their longitudinal axes.

3. A wave action device as claimed in claim 1, wherein said mounting means mounts said blades on said supports in a manner whereby said blades are collectively displaceable transversely and adjustably inclinable relative to horizontal.

4. A wave action device as claimed in claim 1, wherein said blades consist of metal.

5. A wave action device as claimed in claim 1, wherein said mounting means mounts said blades on said supports in a manner whereby said blades are individually adjustable relative to horizontal about their longitudinal axes.

6. A wave action device as claimed in claim 1, wherein said mounting means slidably mounts said blades on said supports in a manner whereby said blades are individually inclinable relative to horizontal.

* * * * *